US009421927B2

(12) United States Patent
Basappa et al.

(10) Patent No.: US 9,421,927 B2
(45) Date of Patent: Aug. 23, 2016

(54) VEHICLE LOAD TRANSFER APPARATUS

(71) Applicant: GM GLOBAL TECHNOLOGY OPERATIONS LLC, Detroit, MI (US)

(72) Inventors: Vedanth M. Basappa, Birch Run, MI (US); Len V. Peschansky, West Bloomfield, MI (US); Bradley E. Bowers, Holly, MI (US); Bhushan W. Dandekar, Rochester Hills, MI (US); Huai-Yang Chiang, Troy, MI (US); Wayne J. Sturgill, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/227,357

(22) Filed: Mar. 27, 2014

(65) Prior Publication Data

US 2015/0274209 A1    Oct. 1, 2015

(51) Int. Cl.
| | | |
|---|---|---|
| *B60R 19/26* | (2006.01) | |
| *B60R 19/04* | (2006.01) | |
| *B62D 21/15* | (2006.01) | |
| *B62D 25/08* | (2006.01) | |
| *B60R 21/00* | (2006.01) | |

(52) U.S. Cl.
CPC .............. *B60R 19/26* (2013.01); *B60R 19/04* (2013.01); *B62D 21/152* (2013.01); *B62D 25/082* (2013.01); *B60R 2021/0023* (2013.01)

(58) Field of Classification Search
CPC  B62D 21/155; B62D 25/082; B60R 19/023; B60R 19/26
See application file for complete search history.

(56) References Cited

U.S. PATENT DOCUMENTS

| | | | | |
|---|---|---|---|---|
| 6,866,115 | B2* | 3/2005 | Miyasaka | 180/311 |
| 7,771,137 | B2* | 8/2010 | Anzai et al. | 403/379.3 |
| 7,819,218 | B2* | 10/2010 | Eichberger et al. | 180/274 |
| 7,926,847 | B2* | 4/2011 | Auer et al. | 280/784 |
| 8,398,154 | B1* | 3/2013 | Nusier et al. | 296/187.1 |
| 8,480,130 | B2* | 7/2013 | Dandekar et al. | 280/784 |
| 8,746,764 | B2* | 6/2014 | Parkila et al. | 293/133 |
| 8,907,632 | B2* | 12/2014 | Morita et al. | 320/139 |
| 8,991,903 | B1* | 3/2015 | Alavandi et al. | 296/187.09 |
| 9,016,768 | B2* | 4/2015 | Makino et al. | 296/187.1 |
| 2012/0248820 | A1* | 10/2012 | Yasui et al. | 296/187.09 |
| 2014/0062106 | A1* | 3/2014 | Han | 293/133 |
| 2014/0091585 | A1* | 4/2014 | Ramoutar et al. | 293/133 |
| 2014/0159420 | A1* | 6/2014 | Hashimoto et al. | 296/187.1 |
| 2014/0191105 | A1* | 7/2014 | Dandekar et al. | 248/671 |
| 2015/0102635 | A1* | 4/2015 | Barbat et al. | 296/187.1 |

* cited by examiner

*Primary Examiner* — Darlene P. Condra
(74) *Attorney, Agent, or Firm* — Quinn Law Group, PLLC

(57) ABSTRACT

A load transfer apparatus for a vehicle includes a first deflector member that is securable both to a body mount bracket that extends from a frame rail and to the frame rail so that a first portion of the frame rail is between the body mount bracket and the bumper, and a second portion of the frame rail is between the body mount bracket and the first deflector member. The first deflector member at least partially forms a load path from the bumper to the frame rail under a sufficient offset load applied to the bumper. The load transfer apparatus may also include a second deflector member securable to the bumper to extend from the bumper such that the second deflector member is spaced from and free from contact with the body mount bracket and the first deflector member prior to application of the sufficient offset load to the bumper.

14 Claims, 9 Drawing Sheets

VEHICLE LOAD TRANSFER APPARATUS

TECHNICAL FIELD

The present teachings generally include a load transfer apparatus for a vehicle that creates a load path from a bumper to a frame rail.

BACKGROUND

Vehicles are often equipped with various components configured to manage the energy of an applied force. For example, a bumper may be attached to frame rails to manage energy applied to the bumper.

SUMMARY

A load transfer apparatus for a vehicle includes a first deflector member that is securable both to a body mount bracket that extends from a frame rail and to the frame rail so that a first portion of the frame rail is between the body mount bracket and the bumper, and a second portion of the frame rail is between the body mount bracket and the first deflector member. The first deflector member at least partially forms a load path from the bumper to the frame rail under a sufficient offset load applied to the bumper. The deflector member can thus direct the laterally offset load laterally inward to the frame rail, and to components laterally inward of the frame rail and the deflector member, such as an engine assembly, thereby allowing dissipation of the load.

The load transfer apparatus may also include a second deflector member securable to the bumper to extend from the bumper such that the second deflector member is spaced from and free from contact with the body mount bracket and the first deflector member prior to application of the sufficient offset load to the bumper. Under application of the sufficient offset load to the bumper, however, the second deflector member is configured to contact at least one of the body mount bracket and the first deflector member to further form the load path. Moreover, the second deflector member may be configured to move with the bumper free from contact with either of the body mount bracket and the first deflector member under application of a laterally-centered load. Accordingly, under application of the laterally-centered load, the initial load path will be through the first portion of the frame rail, and the full energy absorbing capability of the first portion of the frame rail is not bypassed by a load path through the first and second deflector members under the laterally-centered load.

The above features and advantages and other features and advantages of the present teachings are readily apparent from the following detailed description of the best modes for carrying out the present teachings when taken in connection with the accompanying drawings.

DETAILED DESCRIPTION

Figure 1:
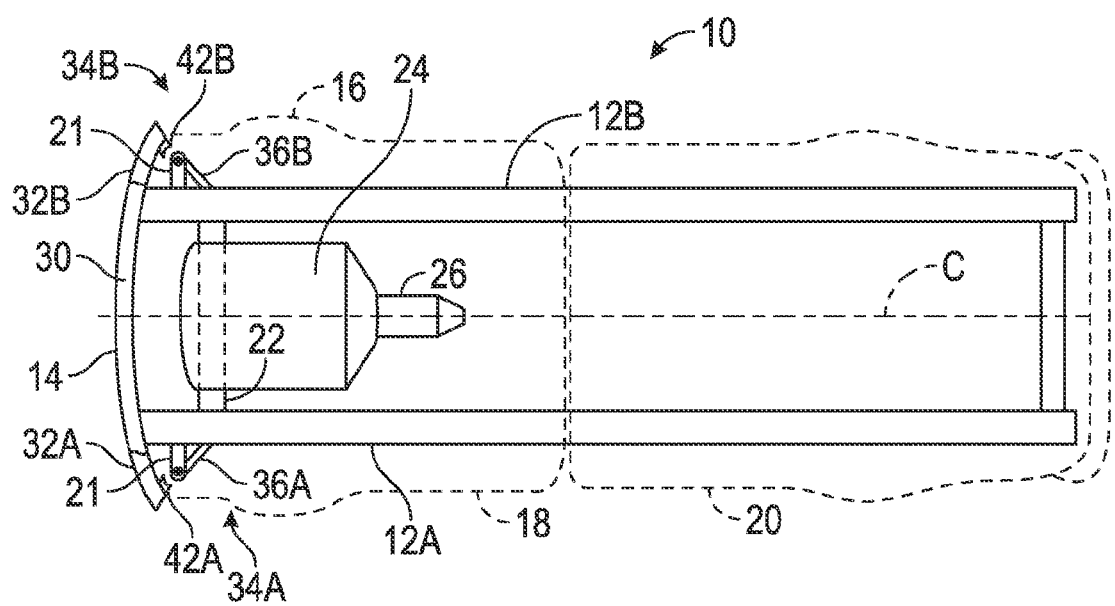
FIG. 1 is a schematic illustration in top view of a vehicle.

Referring to the drawings, wherein like reference numbers refer to like components throughout the views, FIG. 1 shows a schematic illustration of a vehicle 10 with longitudinally-extending frame rails 12A, 12B, a longitudinal center axis C, and a bumper 14 secured to the front ends of the frame rails. The frame rails 12A, 12B are laterally spaced from one another and are laterally outboard of the center axis C. The vehicle 10 has a body 16 (shown in phantom in FIG. 1) supported on the frame rails 12A, 12B, in what is referred to as a body-on-frame structure. As such, the vehicle 10 may be a truck with the body 16 including a cab portion 18 and a bed portion 20, but is not limited to such within the scope of the present teachings.

Figure 2:
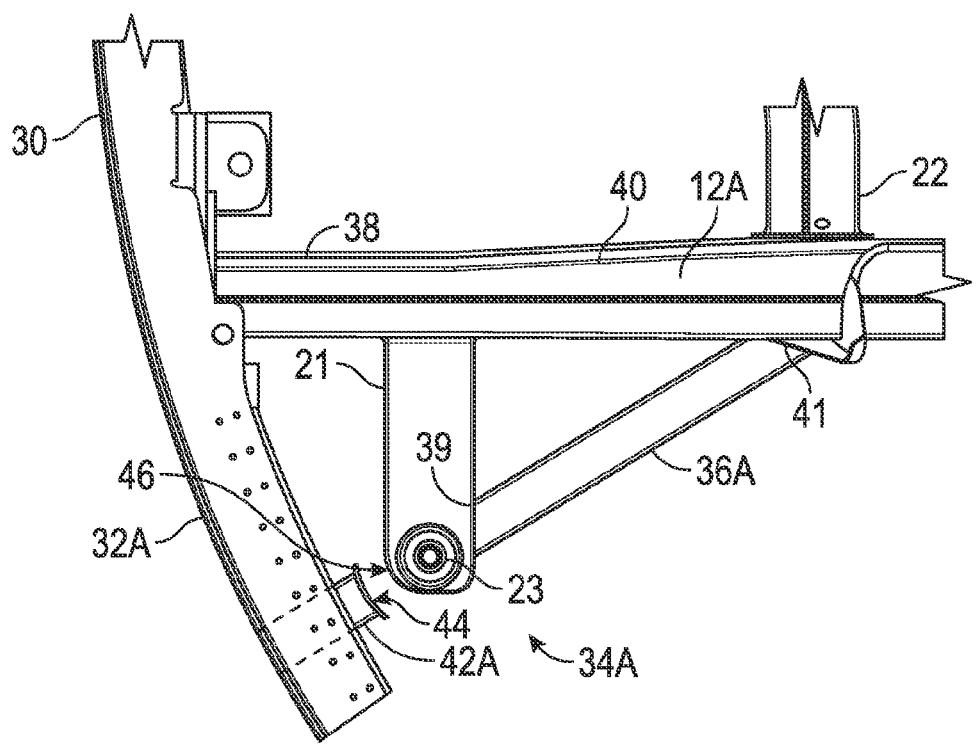
FIG. 2 is a schematic illustration in fragmentary top view of a portion of the vehicle of FIG. 1 with the body removed and showing a load transfer apparatus.

Body mount brackets 21, two of which are illustrated, extend laterally outward from the rails 12A, 12B and receive and support the body 16. A body mount 23 extends from each body mount bracket 21, as best shown in FIG. 2, and is configured to receive the body 16 to mount the body 16 to frame rail 12A via the body mount bracket 21. Additional body mount brackets, not shown, are distributed along the frame rails 12A, 12B to support the body 16.

A cross member 22 is supported by the frame rails 12A, 12B and extends laterally between the frame rails 12A, 12B.

An engine assembly 24 is supported on the cross member 22 and the frame rails 12A, 12B. A transmission 26 is mounted to the engine assembly 24 and extends generally longitudinally, such as in a rear-wheel drive arrangement. The bumper 14, frame rails 12A, 12B, and the cross member 22 are configured to be relatively high strength, load-bearing members, such as steel. The frame rails 12A, 12B and the cross member 22 can each be multiple stamped, welded components, and may be arranged to be generally hollow in cross-section.

The bumper 14 is outboard of the cross member 22 and the engine assembly 24. As used herein, the term "outboard" refers to a component further from a center of the vehicle 10 than an "inboard" component that is closer to the center. Laterally-outboard refers to a component further laterally from the longitudinal center axis C than a laterally-inboard component. The bumper 14 can also be multiple welded components. The bumper 14 shown has a center portion 30 and two distal portions 32A, 32B secured to either end of the center portion 30. The distal portions 32A, 32B curve generally laterally outward and in a direction along the longitudinal center axis C toward the body mount brackets 21. In other embodiments, the distal portions 32A, 32B can be unitary with the center portions 30. In still other embodiments, the center portion 30 and/or the distal portions 32A, 32B can be straight rather than curved.

As further discussed with respect to FIGS. 5-8, load transfer apparatuses 34A and 34B are positioned at each of the distal portions 32A, 32B, and frame rails 12A, 12B, respectively, to transfer loads applied to the distal portion 32A, 32B thereby managing the energy of the loads as described herein. The load transfer apparatus 34A is described in detail with respect to FIGS. 5-8. Load transfer apparatus 34B functions in an identical manner to load transfer apparatus 34B. Referring to FIG. 2, the load transfer apparatus 34A is shown. The load transfer apparatus 34A includes a first deflector member 36A secured to the body mount bracket 21 and to the frame rail 12A so that a first portion 38 of the frame rail 12A is between the body mount bracket 21 and the bumper 30, and a second portion 40 of the frame rail 12A is between the body mount bracket 21 and the first deflector member 36A. Stated differently, one end 39 of the first deflector member 36A is secured to the body mount bracket 21 and the other end 41 of the first deflector member 36A is secured to the frame rail 12A. The body mount bracket 21 is secured to the frame rail 12A, such as by welding, at a position between the end of the frame rail 12A at which the bumper 14 is mounted, and the position on the frame rail 12A at which the other end 41 of the first deflector member 36A is secured. The first deflector member 36A extends generally linearly in a partially rearward and partially inboard direction from the body mount bracket 21 to the frame rail 12A.

The load transfer apparatus 34A further includes a second deflector member 42A that is secured to the distal portion 32A of the bumper 14 to extend from the bumper 14 at least partially toward the first deflector member 36A. The second deflector member 42A of the embodiment of FIG. 2 is spaced from and free from contact with the body mount bracket 21 and the first deflector member 36A in the absence of a sufficient offset load applied to the distal portion 32A. The second deflector member 42A has a generally concave surface 44 facing a generally convex surface 46 of the body mount bracket 21.

Figure 6:
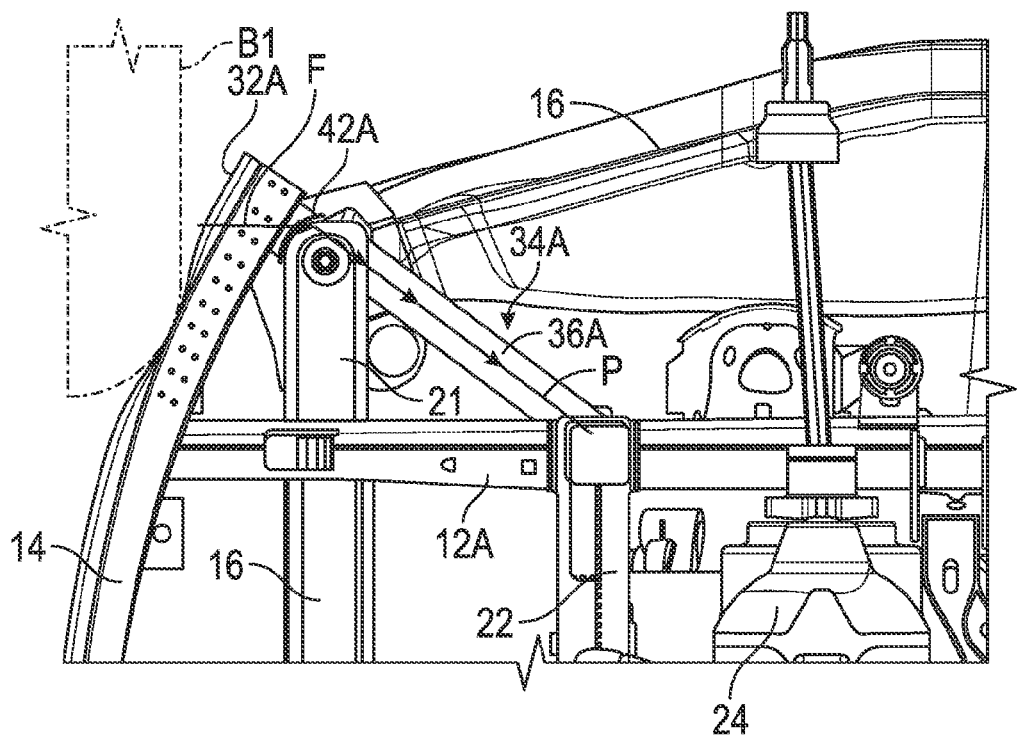
FIG. 6 is a schematic illustration of the portion of vehicle of FIG. 5 in fragmentary bottom view with the barrier in contact with the bumper at an offset from the center longitudinal axis of the vehicle.

As shown and discussed with respect to FIG. 6, under an offset load F of sufficient magnitude applied to the distal portion 32A, the distal portion 32A and the second deflector member 42A move so that the surface 44 contacts the surface 46. When the second deflector member 42A is in contact with the body mount bracket 21, the first deflector member 36A and the second deflector member 42A at least partially form a load path P from the bumper 14 to the frame rail 12A, and thereby to the engine assembly 24, under a sufficient laterally offset load applied to the bumper 14, and more specifically to an offset load applied to the distal portion 32A. As used herein, a laterally offset load is a load applied to the bumper 14 and centered at a lateral distance from the center longitudinal axis C. The load transfer apparatus 34B has a similar first deflector member 36B and second deflector member 42B arranged in a mirror image of the load transfer apparatus 34A, and deflecting offset loads applied to the distal portion 32B.

As shown, the bumper 14 is a front bumper secured to front ends of the frame rails 12A, 12B, and the load transfer apparatuses 34A, 34B transfer offset loads applied to the distal portions 32A, 32B of the front bumper 14 to the rails 12A, 12B and laterally inward to the engine assembly 24. The load transfer apparatuses 34A, 34B, however, could instead be positioned at the rear ends of the frame rails 12A, 12B, and on a rear bumper, to transfer offset loads applied to the rear bumper. Still further, in other embodiments, a load transfer apparatus similar to 34A could be positioned at a lateral side of the vehicle 10.

Figure 3:
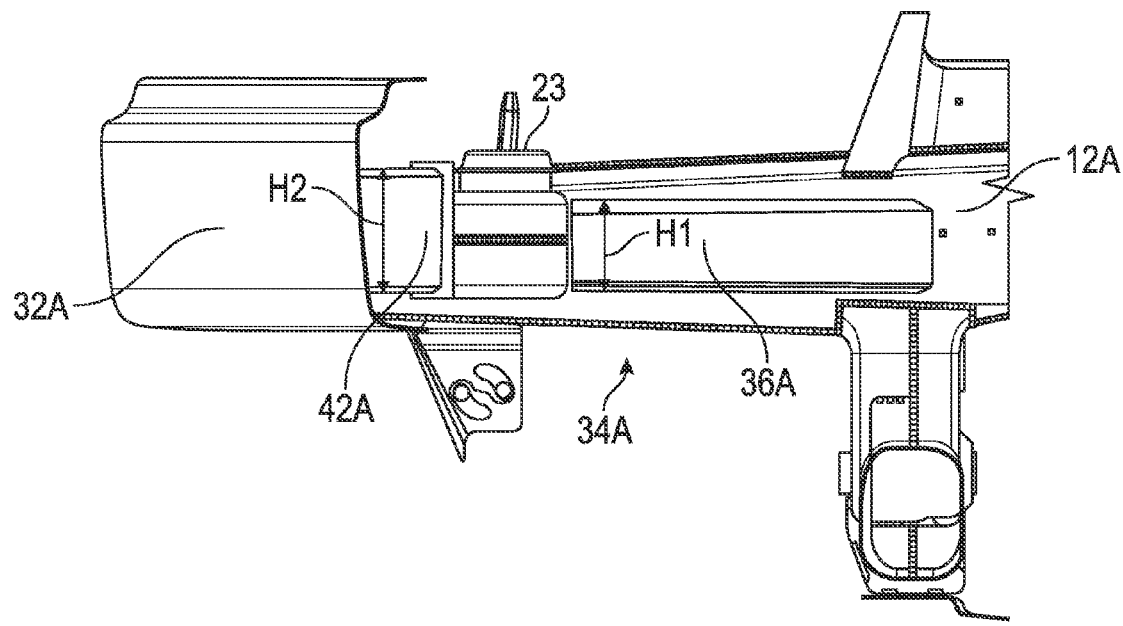
FIG. 3 is a schematic fragmentary side view illustration of the portion of the vehicle with the load transfer apparatus of FIG. 2.
Figure 4:
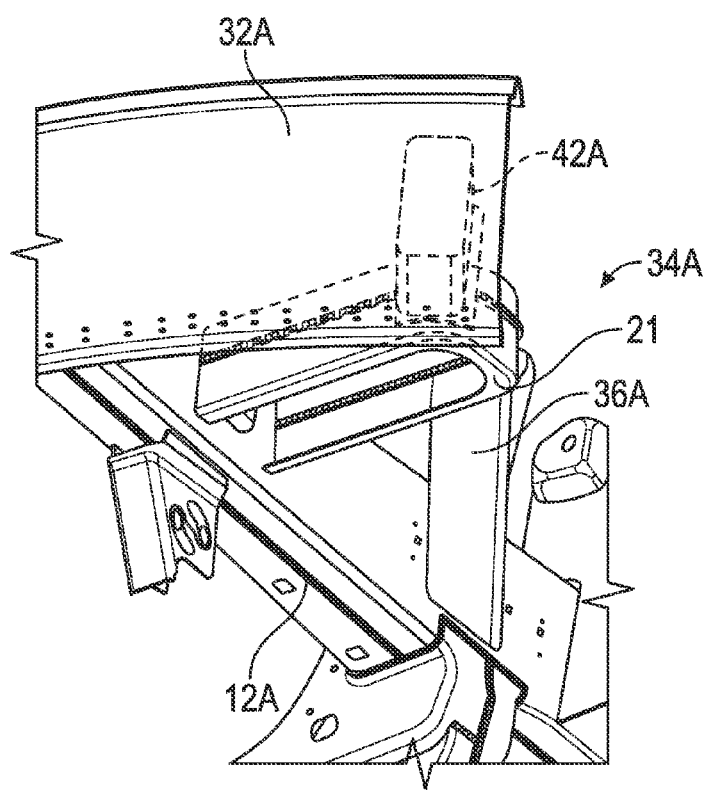
FIG. 4 is a schematic illustration in fragmentary perspective view of the portion of the vehicle of FIG. 1 with the load transfer apparatus of FIGS. 2 and 3.

FIG. 3 illustrates that the first deflector member 36A has a height H1 and the second deflector member 42A has a height H2. The height H2 is greater than the height H1. This helps to ensure overlap so that, even if the second deflector member 42A is deformed when the offset load F is transferred from the bumper 14 through the second deflector member 42A, the contact area of the second deflector member 42A with the body mount bracket 21 will overlap with the height H1 of the first deflector member 36A. FIG. 4 illustrates that the body mount bracket 21 is substantially hollow, so that the body mount bracket 21 can absorb only a portion of an offset load F, with the remainder of the load F transferred through the first deflector member 36A.

Figure 5:
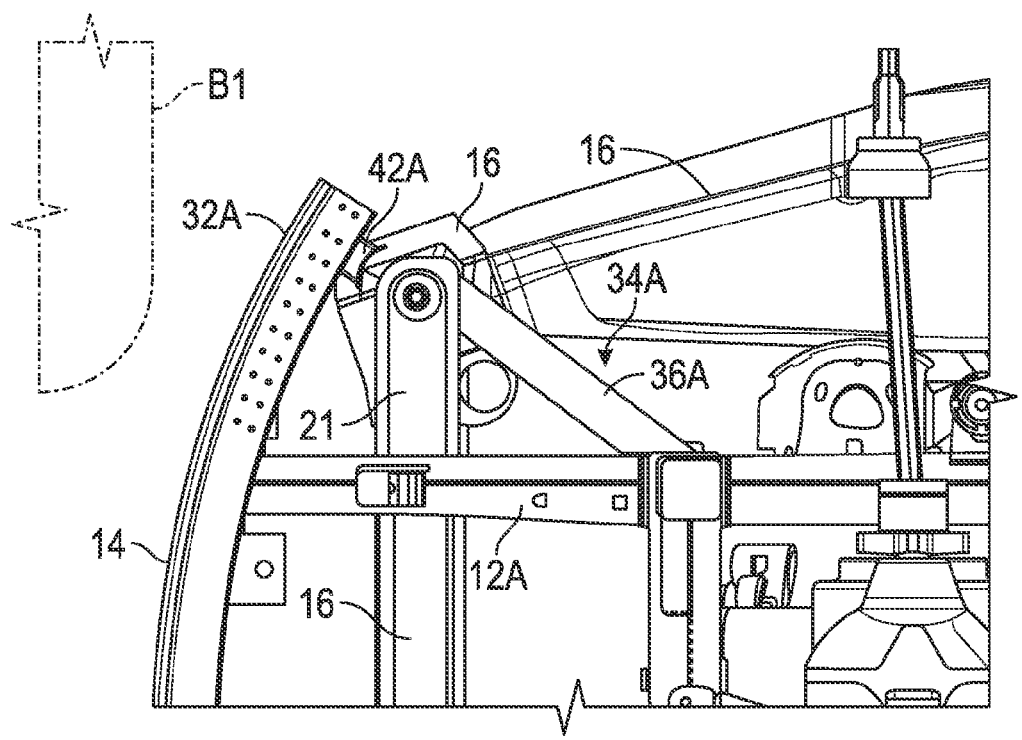
FIG. 5 is a schematic illustration of the portion of the vehicle of FIGS. 1-4 in fragmentary bottom view and showing a barrier in phantom spaced from the bumper.
Figure 7:
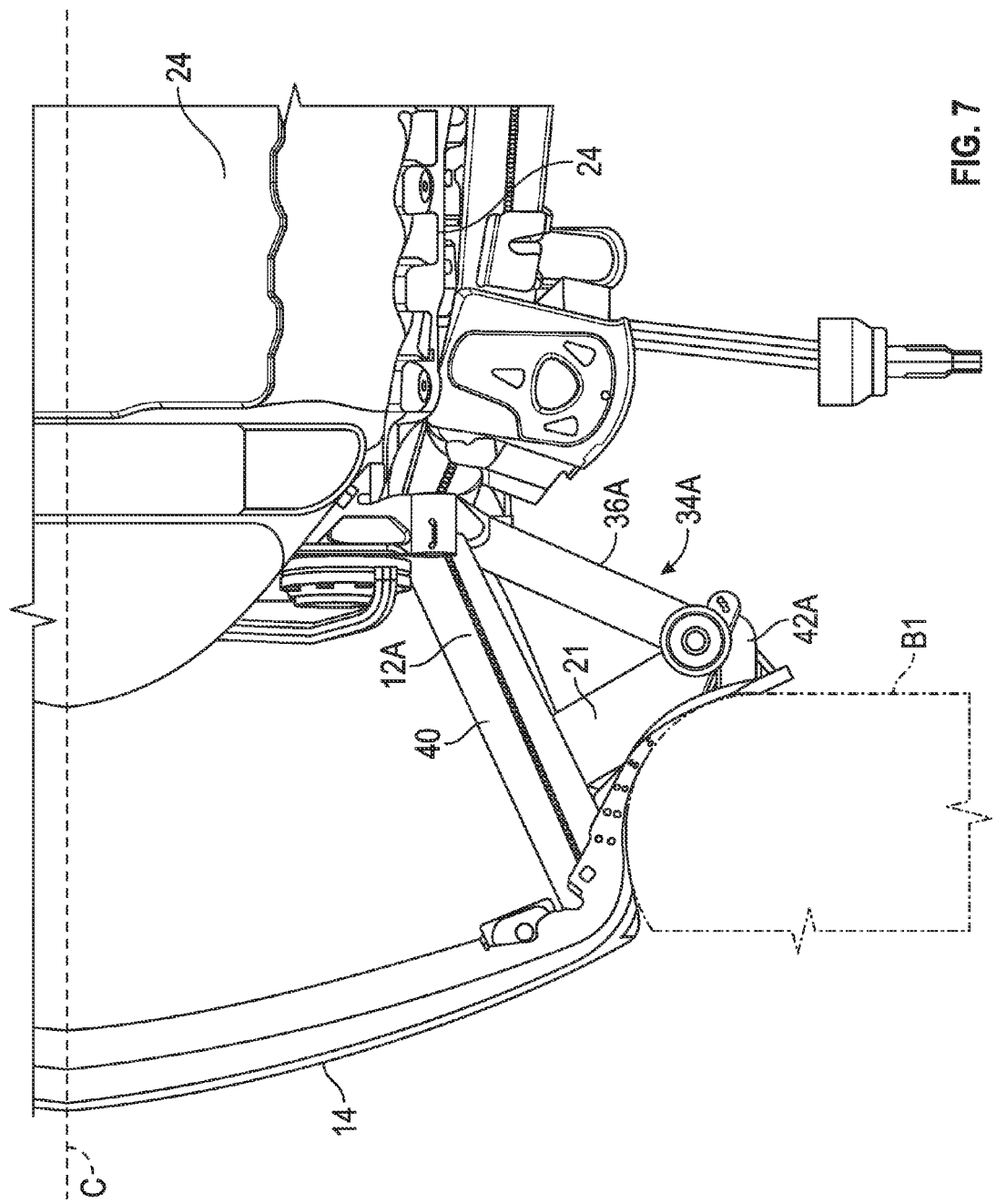
FIG. 7 is a schematic illustration of the portion of the vehicle of FIGS. 5-6 in fragmentary top view with the load transfer apparatus further transferring the offset load.
Figure 8:
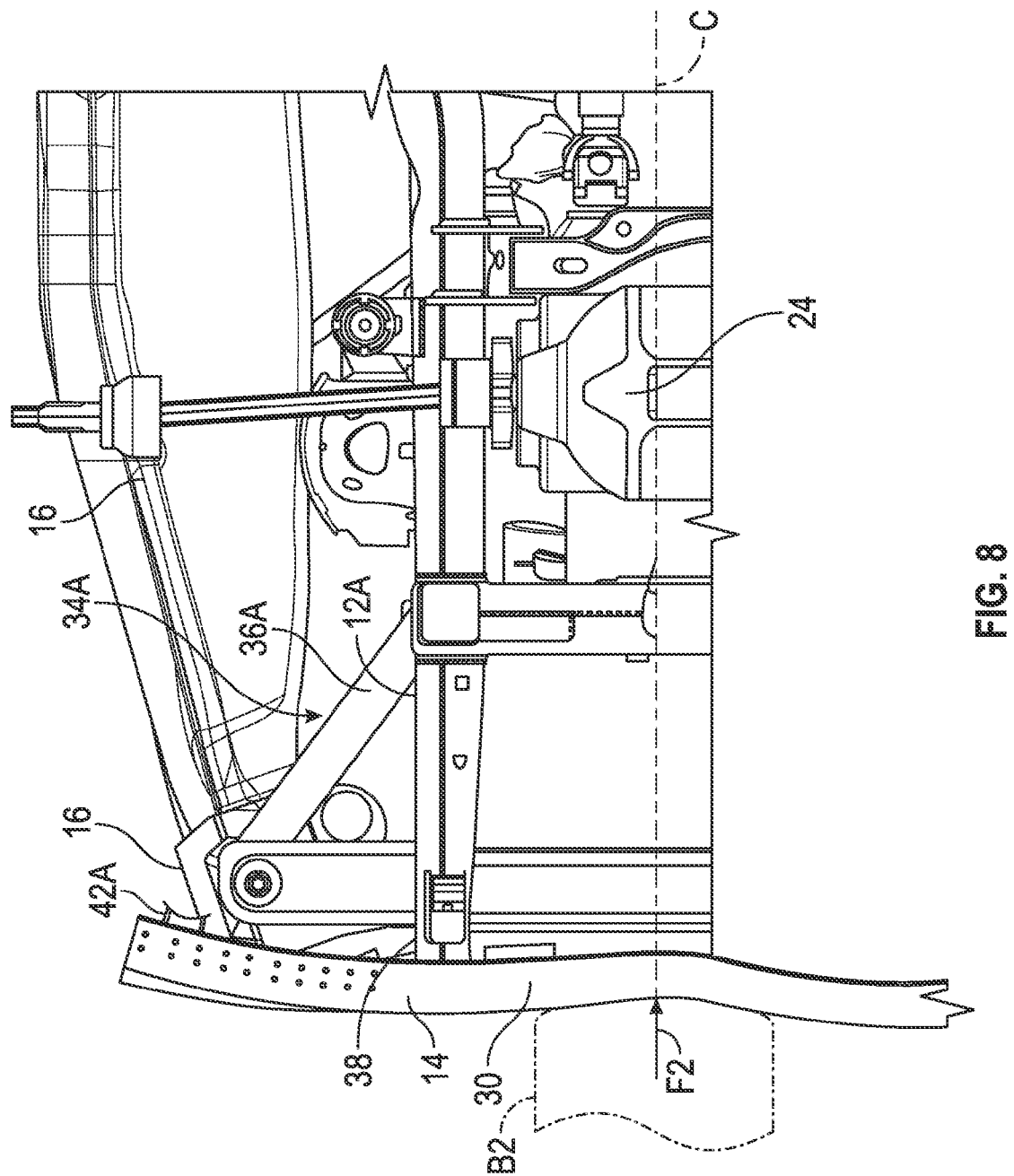
FIG. 8 is a schematic illustration of the portion of vehicle of FIG. 5 in fragmentary bottom view with a barrier shown in phantom in contact with the bumper and centered at the center longitudinal axis of the vehicle.

FIGS. 5-7 show load transfer via the load transfer apparatus 34A when the sufficient laterally offset load F is applied to the distal portion 32A of the bumper 14. FIG. 8 illustrates that the load transfer apparatus 34A is configured such that the frame rail 12A is able to function as intended to provide energy management under a centrally-applied load. Specifically, FIG. 5 shows barrier B1 prior to contact with the bumper 14. The second deflector apparatus 42A is spaced from the first deflector apparatus 36A. FIG. 6 shows the barrier B1 applying a load to the distal portion 32A, with the load F being sufficient to cause energy absorption through deformation of the distal portion 32A, and so that distal portion 32A and attached second deflector member 42A move under the applied load F, placing the second deflector member 42A into contact with the body mount bracket 21, and transferring a portion of the load F along the load path P to the frame rail 12A and then to the attached engine assembly 24.

FIG. 7 shows that with continued application of the sufficient load F, the second deflector member 42A and the body mount bracket 21 begin to deform, dissipating energy. The body mount bracket 21 is moved partially rearward and, due to the laterally rearward and partially inboard extending first deflector member 36A, the load path is directed partially laterally inboard to the engine assembly 24. The frame rail 12A is moved laterally inboard as well, with the second portion of the frame rail 12A at which the first deflector member 36A is connected being the leading laterally inboard portion. The frame rail 12A may become kinked as it dissipates energy so that it is no longer generally parallel with the longitudinal center axis C. Directing the offset load F laterally inboard via the load transfer apparatus 34A enables the engine assembly 24 to be used for energy dissipation.

FIG. 8 illustrates that the second deflector member 42A initially moves forward and laterally outward when a barrier B2 applies a centrally applied load F2 to the curved central portion 30 of the bumper 14, flattening the curve of central portion 30. In fact, the distal portion 32A and the second deflector member 42A move without contact with the body mount bracket 21, allowing the first portion 38 of the frame rail 12A to function as intended to dissipate at least some of the energy of the load F2. Accordingly, a load path is not formed via the first and second deflector members 36A, 42A and the body mount bracket 21 under a centrally applied load F2. The load F2 is instead managed equally by the frame rails 12A, 12B (not shown in FIG. 8), and the load transfer apparatuses 34A, 34B are configured so that the centrally-applied load cannot bypass the energy dissipating capability of the first portions 38 of the frame rails 12A, 12B through the load transfer apparatuses 34A, 34B.

Figure 9:
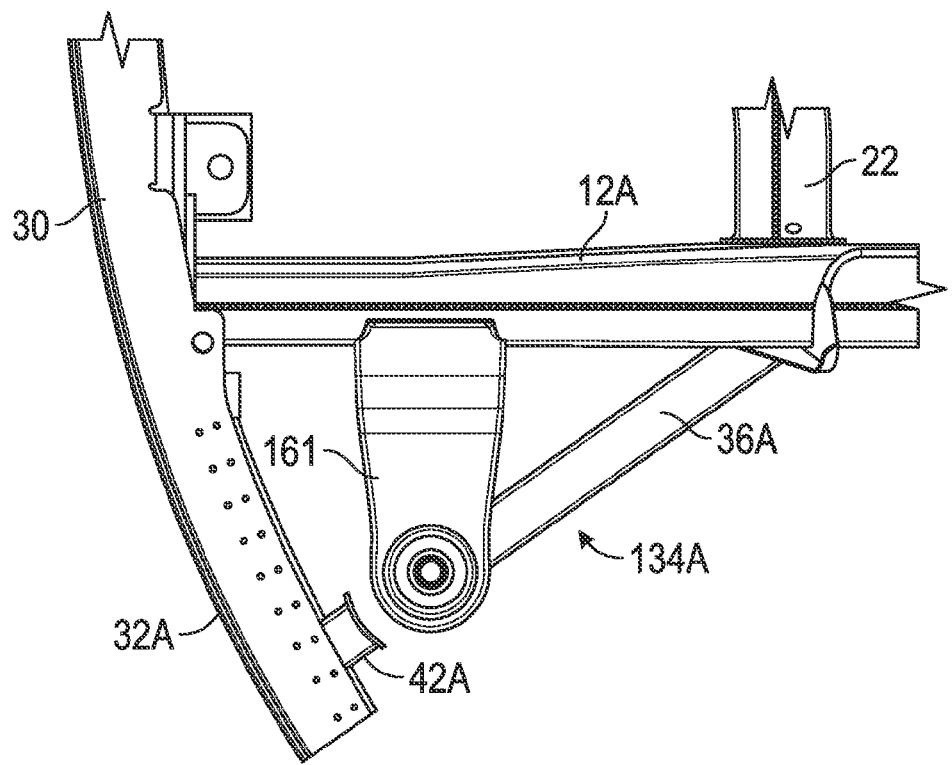
FIG. 9 is a schematic illustration in fragmentary top view of a portion of a different vehicle with an alternative load transfer apparatus in accordance with an alternative aspect of the present teachings.
Figure 10:
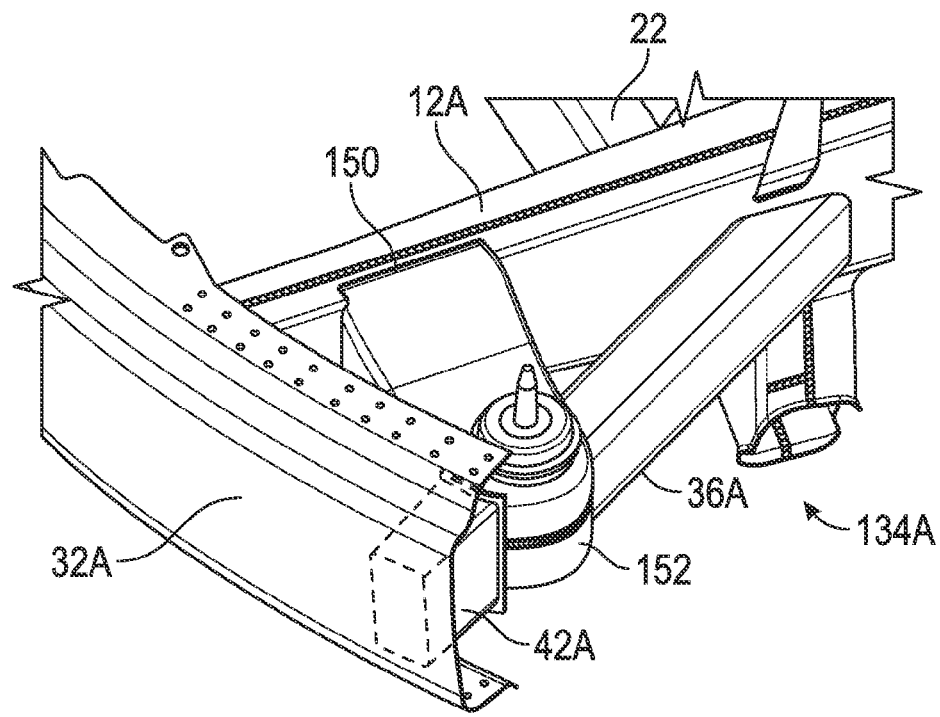
FIG. 10 is a schematic illustration in perspective view of the vehicle and load transfer apparatus of FIG. 9.

FIGS. 9 and 10 show an embodiment of a load transfer apparatus 134A that can be used on the vehicle 10 and that is alike in all aspects to load transfer apparatus 34A of FIG. 2 except that a different body mount bracket 161 is used in place of body mount bracket 21. Components that are the same as those shown and described with respect to FIG. 2 are indicated with like reference numbers. The body mount bracket 161 is wider at an end 150 where connected to the frame rail 12A than at the end 152 near where the first deflector member 36A is connected. This configuration of the body mount bracket 161 distributes loading over a greater portion of the frame rail 12A, and may be suitable for specific vehicle configurations, depending on size and mass.

Figure 11:
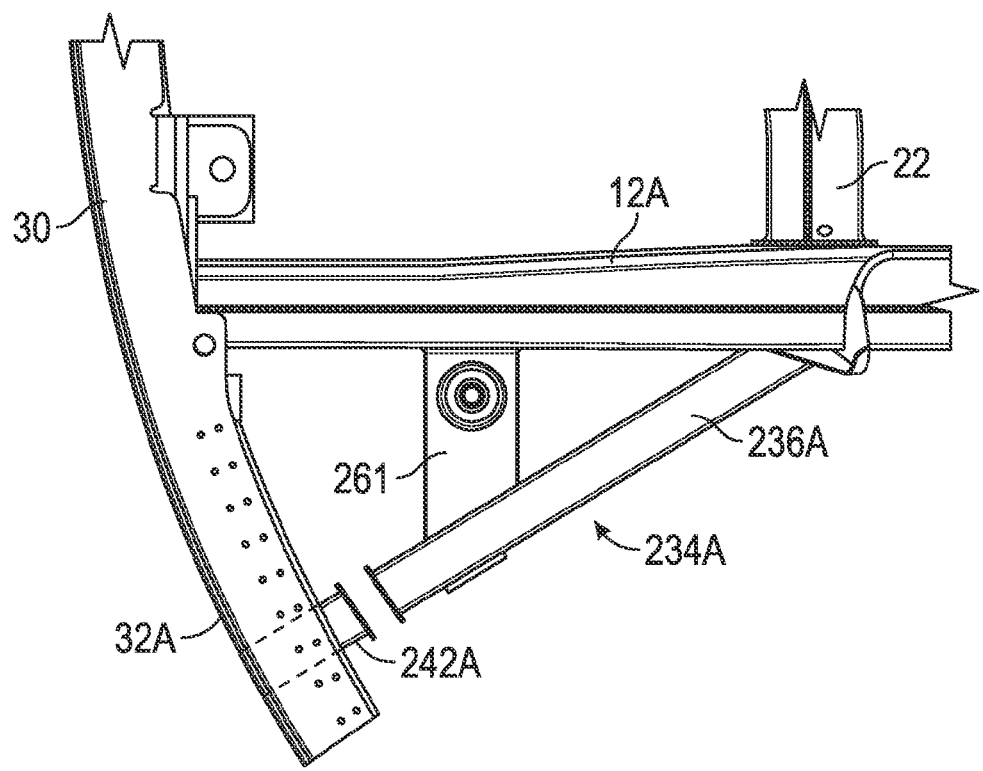
FIG. 11 is a schematic illustration in fragmentary top view of a portion of a different vehicle with an alternative load transfer apparatus in accordance with an alternative aspect of the present teachings.
Figure 12:
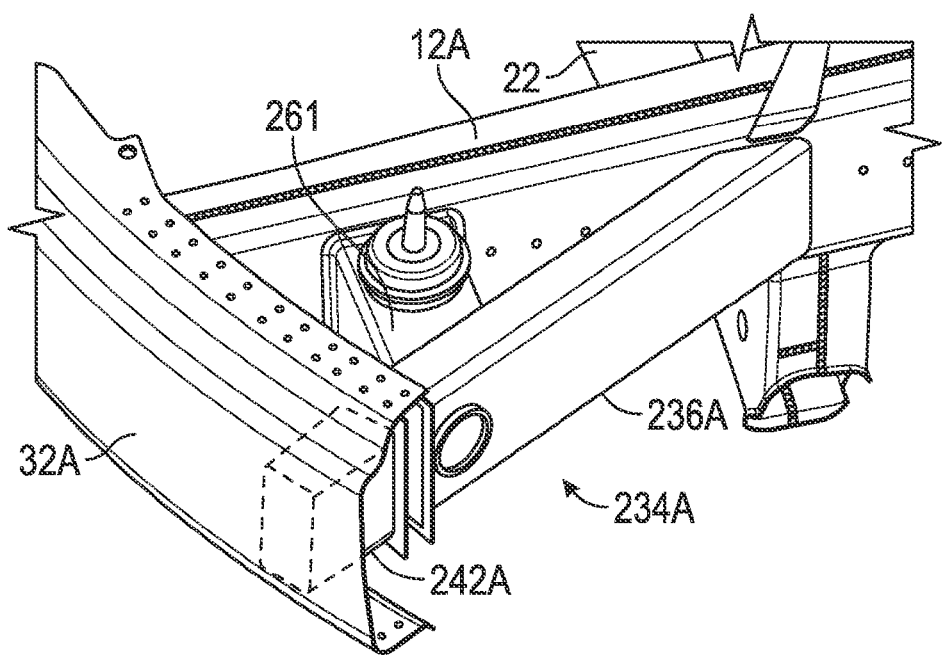
FIG. 12 is a schematic illustration in perspective view of the vehicle and load transfer apparatus of FIG. 11.

FIGS. 11 and 12 show an embodiment of a load transfer apparatus 234A that can be used on the vehicle 10. The load transfer apparatus 234A has a first deflector member 236A that extends further toward the second deflector member 242A, so that the second deflector member 242A will interface with the first deflector member 236A, rather than directly with the body mount bracket 261, under application of an offset load to the distal portion 32A of the bumper 14. In each of the load transfer apparatuses 34A, 134A, 234A, the second deflector member 42A, 242A is free from contact with both the first deflector member 36A, 236A, and the body mount bracket 21, 161, 261, respectively, prior to application of the offset load to the distal portion 32A of the bumper 14.

Figure 13:
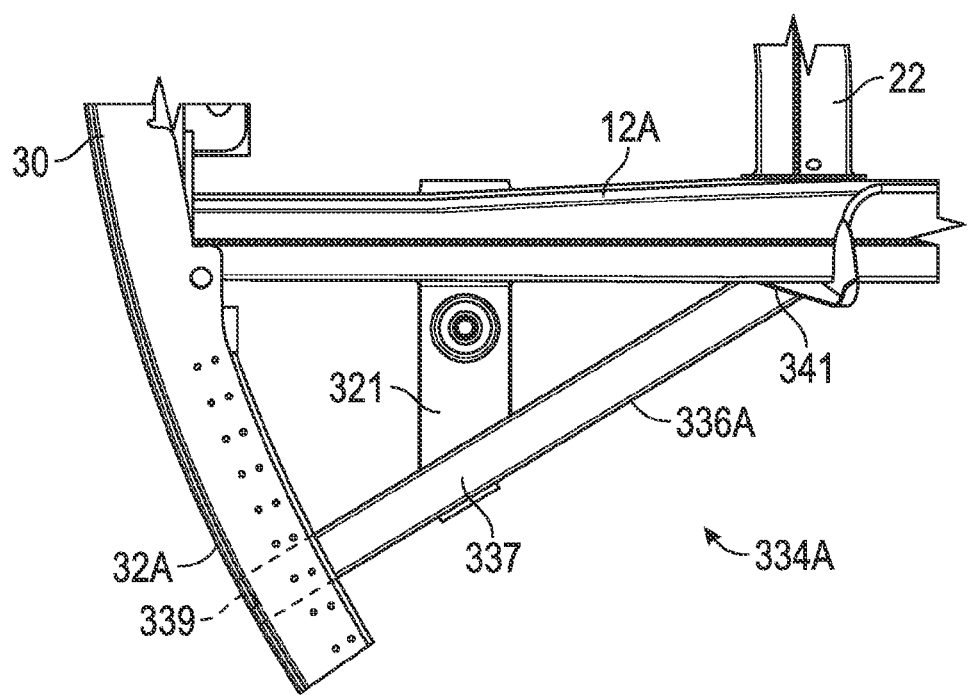
FIG. 13 is a schematic illustration in fragmentary top view of a portion of a different vehicle with an alternative load transfer apparatus in accordance with an alternative aspect of the present teachings.
Figure 14:
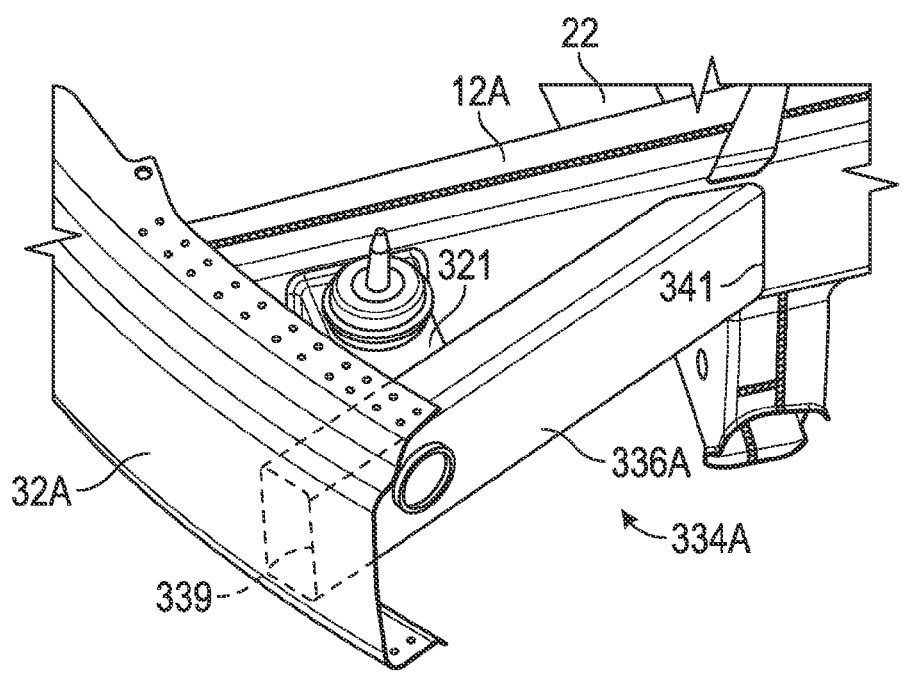
FIG. 14 is a schematic illustration in perspective view of the vehicle and load transfer apparatus of FIG. 13.

FIGS. 13 and 14 shows an embodiment of a load transfer apparatus 334A that can be used on the vehicle 10 and that has a unitary deflector member 336A that is attached at one end 339 to the distal portion 32A, and at a second end 341 to the frame rail 12A. No separate deflector member 42A is used. A midportion 337 of the deflector member 336A is attached to a body mount bracket 321 that extends laterally outboard from the frame rail 12A. The deflector member 336A extends generally linearly from the distal portion 32A to the body mount bracket 321, and from the body mount bracket 321 to the frame rail 12A. The deflector member 336A may be configured with stress initiators forward of the body mount member 321 to manage energy of the offset load.

Figure 15:
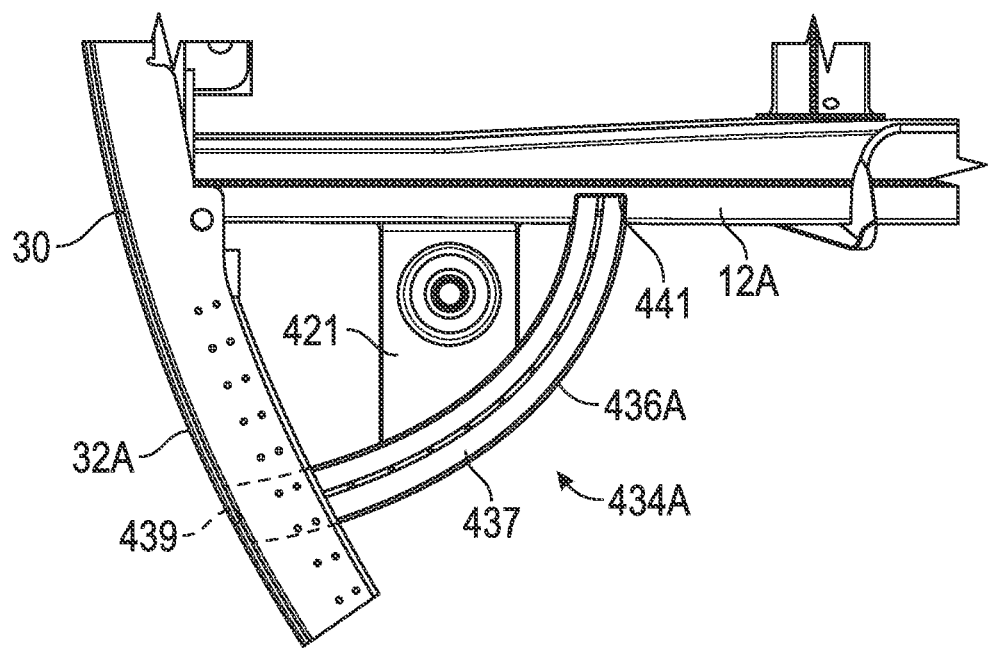
FIG. 15 is a schematic illustration in fragmentary top view of a portion of a different vehicle with an alternative load transfer apparatus in accordance with an alternative aspect of the present teachings.
Figure 16:
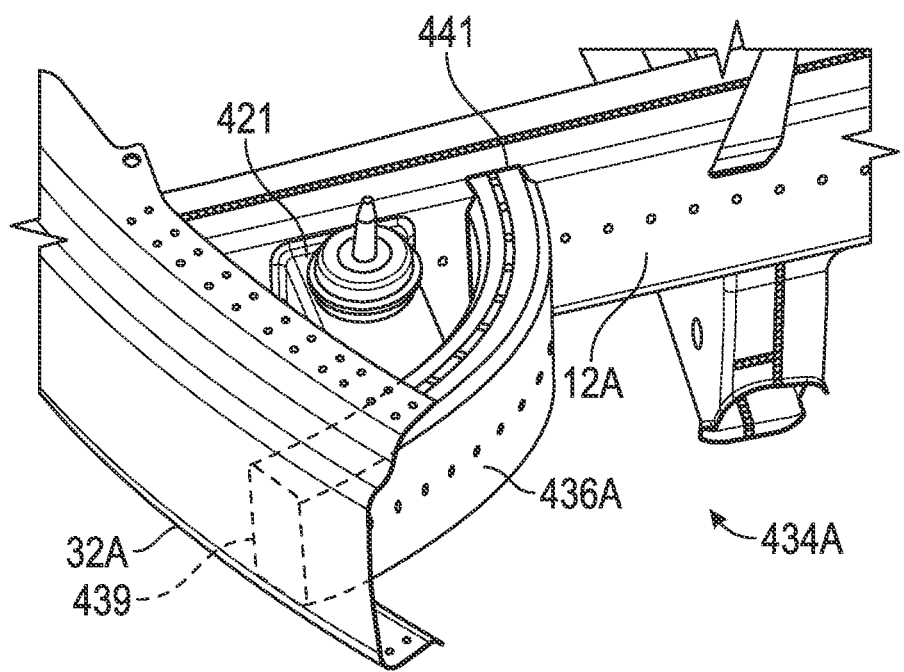
FIG. 16 is a schematic illustration in perspective view of the vehicle and load transfer apparatus of FIG. 15.

FIGS. 15 and 16 show an embodiment of a load transfer apparatus 434A that can be used on the vehicle 10 and that has a unitary deflector member 436A that is attached at one end 439 to the distal portion 32A, and at a second end 441 to the frame rail 12A. No separate deflector member 42A is used. A midportion 437 of the deflector member 436A is attached to a body mount bracket 421 that extends laterally outboard from the frame rail 12A. The deflector member 436A extends generally nonlinearly between from the distal portion 32A to the body mount bracket 421, and from the body mount bracket 421 to the frame rail 12A. The deflector member 436A may be configured with stress initiators forward of the body mount member 421 to manage energy of the offset load.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A load transfer apparatus for a vehicle that has a longitudinally-extending frame rail, a bumper secured to the frame rail, and a body mount bracket extending laterally outward from the frame rail, the load transfer apparatus comprising:
   a first deflector member securable to the body mount bracket and to the frame rail so that a first portion of the frame rail is between the body mount bracket and the bumper, and a second portion of the frame rail is between the body mount bracket and the first deflector member and is spaced apart from both the body mount bracket and the first deflector member; and
   wherein the first deflector member at least partially forms a load path from the bumper to the frame rail under a sufficient offset load applied to the bumper.

2. The load transfer apparatus of claim 1, further comprising:
   a second deflector member securable to the bumper to extend from the bumper;
   wherein the second deflector member is spaced from and free from contact with the body mount bracket and the first deflector member prior to application of the sufficient offset load to the bumper; and wherein the second deflector member contacts at least one of the body mount bracket and the first deflector member under the sufficient offset load to further form the load path.

3. The load transfer apparatus of claim 1, wherein the first deflector member extends generally linearly from the body mount bracket to the frame rail when secured to the body mount bracket and to the frame rail.

4. The load transfer apparatus of claim 1, wherein the first deflector member extends nonlinearly from the body mount bracket to the frame rail when secured to the body mount bracket and to the frame rail.

5. The load transfer apparatus of claim 1, further comprising:
   a second deflector member securable to the bumper to extend from the bumper; wherein the second deflector member contacts at least one of the body mount bracket and the first deflector member under the sufficient offset load to further form the load path; and
   wherein the second deflector member has a greater height than the first deflector member.

6. The load transfer apparatus of claim 1, further comprising:
   a second deflector member securable to the bumper to extend from the bumper; wherein the second deflector member contacts at least one of the body mount bracket and the first deflector member under the sufficient offset load to further form the load path; and wherein the second deflector member is configured to move with the bumper free from contact with either of the body mount bracket and the first deflector member under application of a laterally-centered load when the second deflector member is secured to the bumper.

7. A vehicle having a longitudinal center axis and comprising:

a frame rail extending longitudinally;

a body mount bracket secured to the frame rail and extending laterally outward from the frame rail;

a bumper secured to the frame rail;

a first deflector member secured to the body mount bracket and to the frame rail so that a first portion of the frame rail is between the body mount bracket and the bumper, and a second portion of the frame rail is between the body mount bracket and the first deflector member; wherein the first deflector member extends generally linearly from the body mount bracket to the frame rail;

wherein the first deflector member at least partially forms a load path from the bumper to the frame rail under a sufficient offset load applied to the bumper and laterally offset from the longitudinal center axis;

a second deflector member secured to the bumper and extending from the bumper such that the second deflector member is spaced from and free from contact with the body mount bracket and the first deflector member prior to application of the sufficient offset load to the bumper; wherein the second deflector member contacts at least one of the body mount bracket and the first deflector member under the sufficient offset load to further form the load path;

wherein the bumper has a center portion laterally inward of the frame rail, and a distal portion laterally outward of the frame rail; wherein the second deflector member is secured to the distal portion of the bumper; and wherein the distal portion of the bumper is configured to move under application of a sufficient load applied to the bumper laterally centered with respect to the longitudinal center axis so that the second deflector member moves with the distal portion free from contact with either of the body mount bracket and the first deflector member under continued application of the laterally centered load.

8. The vehicle of claim 7, further comprising:

a cross member secured to the frame rail and extending laterally inward from the frame rail;

an engine assembly at least partially supported by the cross member; and wherein the sufficient offset load applied to the bumper is directed at least partially laterally to the engine assembly via the first and second deflector members and the frame rail.

9. The vehicle of claim 7, further comprising:

an engine assembly at least partially supported by the frame rail and at least partially laterally inward of the frame rail; and wherein the sufficient offset load applied to the bumper is directed at least partially laterally to the engine assembly via the first and second deflector members and the frame rail.

10. The vehicle of claim 7, wherein the distal portion curves generally laterally outward and in a direction along the longitudinal axis toward the body mount bracket.

11. The vehicle of claim 7, wherein the second deflector member has a greater height than the first deflector member.

12. A vehicle having a longitudinal center axis and comprising:

a frame rail extending longitudinally;

a body mount bracket secured to the frame rail and extending laterally outward from the frame rail;

a bumper secured to the frame rail; wherein the bumper has a center portion laterally inward of the frame rail, and a distal portion laterally outward of the frame rail;

a first deflector member secured to the body mount bracket and to the frame rail so that a first portion of the frame rail is between the body mount bracket and the bumper, and a second portion of the frame rail is between the body mount bracket and the first deflector member;

a second deflector member secured to the distal portion of the bumper and extending from the bumper at least partially toward the first deflector member, the first deflector member and the second deflector member together at least partially forming a load path from the bumper to the frame rail under a sufficient load applied to the bumper laterally offset from the longitudinal center axis; and wherein the second deflector member has a greater height than the first deflector member.

13. The vehicle of claim 12, wherein the second deflector member is spaced from and free from contact with the body mount bracket and the first deflector member prior to application of the sufficient load to the bumper.

14. The vehicle of claim 13, wherein the distal portion of the bumper is configured to move under application of a sufficient load applied to the bumper laterally centered with respect to the longitudinal center axis so that the second deflector member moves with the distal portion free from contact with either of the body mount bracket and the first deflector member under continued application of the laterally centered load.

* * * * *